Patented Nov. 6, 1945

2,388,656

UNITED STATES PATENT OFFICE 2,388,656

PAINT COMPOSITIONS

Joy G. Lichty, Stow, and Nelson V. Seeger, Cuyahoga Falls, Ohio, assignors to Wingfoot Corporation, Akron, Ohio, a corporation of Delaware No Drawing. Application February 2, 1943, Serial No. 474,490

4 Claims. (Cl. 260—734)

This invention relates to an improved paint composition and, more particularly, to improving a paint which comprises a condensation derivative of rubber and a drying oil.

Rubber may be treated with a variety of reagents and in a variety of manners to produce what are commonly referred to as condensation derivatives. A number of such derivatives are known, and several have been prepared commercially. One representative example is the material known as Pliolite (marketed by The Goodyear Tire & Rubber Company). Such condensation derivatives of rubber have found particular utility as adhesives, paints, molding resins, and the like. When used as paint bases, they are often modified by the addition thereto of drying oils. In some cases the drying oils are simply added to and blended with the paint; in other instances they are heated with the condensation derivative to produce a cooked varnish, as described, for example, in U. S. Patents 2,084,020 and 2,084,039.

According to the present invention, a composition suitable for use as a paint or coating material and comprising both a condensation derivative of rubber and a drying oil is treated with an organic diisocyanate. It is not known for certain what mechanism is involved, but the use of this particular combination produces a marked improvement in the paint or coating composition, which is partly manifested by superior adhesion and flexibility.

The paints and coating compositions of the present invention are prepared in general according to previously known techniques, and may contain various modifying agents, such as plasticizers, diluents, fillers, reinforcing agents, age resisters, resins, dyes, etc. In addition to the condensation derivative of rubber, the drying oil, and any other compounding ingredients, the compositions also contain an organic diisocyanate. Any organic diisocyanate may be employed, including both aliphatic and aromatic diisocyanates. Representative examples are hexamethylene diisocyanate, p-phenylene diisocyanate, metaphenylene diisocyanate, the diphenylene diisocyanates, the toluylene diisocyanates, the dimethyl phenylene diisocyanates, the naphthylene diisocyanates, the diisocyanates of dioxane, ethylene di(oxytrimethylene isocyanate), and the diisocyanates of other glycol ethers, of dipropyl ethers, etc. Methylene di(p-phenylene isocyanate) constitutes a preferred example. These and other diisocyanates may be prepared by passing hydrogen chloride through a solution of the corresponding diamine in an organic solvent, then passing phosgene into the suspension formed by stirring the precipitate of the amine hydrochloride in the solvent, and heating to the reflux temperature of the solvent.

The practice of the invention is illustrated by the following examples, in which the condensation derivative of rubber employed was Pliolite, which is prepared by treating rubber with tin tetrachloride or chlorostannic acid, etc., as illustrated in U. S. 2,052,423.

EXAMPLE 1

A paint was made up according to following Formula A by milling each of the pigments into a portion of the Pliolite on a rubber mill to form a "non-productive" and then forming the solution in xylene.

Formula A

| | Parts by weight |
|---|---|
| Pliolite | 151.6 |
| Titanium dioxide | 130.0 |
| Amorphous silica | 130.0 |
| Yellow iron oxide | 4.2 |
| "Superspectra" carbon black | 1.2 |
| Tung oil | 7.0 |
| Xylene | 400.0 |

This paint was brushed on one side of aluminum, glass, wood and steel as a control. The reverse side was brushed with the same paint, to which had been added 5% by weight of methylene diphenyl diisocyanate. The steel panel was heated at 156° F. for a total of 147 hours. The paint films were checked at various times during this heating and, in each case, the diisocyanate treated film was superior to the control in both adhesion and pliability. The other panels were allowed to stand at room temperature and showed similar improvement.

EXAMPLE 2

Paint made up according to Formula A, to which had been added 5% by weight of hexamethylene diisocyanate, was brushed on steel panels and tested against a control during 105 hours baking at 156° F. Here again the diisocyanate-treated paint gave superior results.

EXAMPLE 3

A paint was made up according to following Formula B by milling the amorphous silica into part of the Pliolite on a rubber mill, milling the remainder of the Pliolite to plasticize it and then forming the solution in xylene.

Formula B

| | Parts by weight |
|---|---|
| Pliolite | 140.9 |
| Amorphous silica | 165.1 |
| Diamyl naphthalene | 70.0 |
| China-wood oil | 8.0 |
| Xylene | 424.0 |

This paint was modified by the addition of both 1% and 4% by weight of methylene diphenyl diisocyanate and these modifications were tested against the unmodified control by painting on steel panels and baking as in Examples 1 and 2. Addition of the diisocyanate resulted in a marked improvement of the paint in each case.

Various other condensation derivatives of rubber may be employed, such as those obtained by treating rubber with boron fluoride, ferric chloride, and other halides of amphoteric metals, with sulfonic and chlorsulfonic acids, with hydrofluoric acid, or with hydrogen halide while the rubber is dissolved in a phenol, etc. Various other drying oils, such as linseed oil, may also be used. The amount of diisocyanate required is generally quite small. It will vary somewhat with the choice of diisocyanate and the condensation derivative of rubber and the compounding. The amount will ordinarily not exceed about 5%, based on the combined weight of the condensation derivative and drying oil, although higher amounts may be used.

What we claim is:

1. A paint or coating composition comprising a solution of a condensation derivative of rubber, a drying oil and a small amount of an organic diisocyanate.

2. An article of manufacture, at least part of which is covered with a coating comprising a condensation derivative of rubber, a drying oil and a small amount of an organic diisocyanate.

3. As a new composition of matter, the product resulting from treating a mixture containing a condensation derivative of rubber and a drying oil, with a small amount of an organic diisocyanate.

4. A paint or coating composition comprising a solution of a condensation derivative of rubber, a drying oil and a small amount of methylene di(para phenylene isocyanate).

JOY G. LICHTY.
NELSON V. SEEGER.